United States Patent
Bigo et al.

[11] Patent Number: 5,473,894
[45] Date of Patent: Dec. 12, 1995

[54] COMBINATION OF TWO PRESSURIZED FLUID MOTORS

[75] Inventors: Louis Bigo, Compiegne; Jacques Fontaine, Verberie; Gilles Lemaire, Les Compiegne, all of France

[73] Assignee: Poclain Hydraulics, France

[21] Appl. No.: 257,697

[22] Filed: Jun. 9, 1994

[30] Foreign Application Priority Data

Jun. 14, 1993 [FR] France .................... 93 07126

[51] Int. Cl.[6] ................................. F16D 31/02
[52] U.S. Cl. ................... 60/483; 60/484; 91/498
[58] Field of Search ............. 91/491, 498; 92/12.1, 92/58, 72; 60/483, 484, 485

[56] References Cited

U.S. PATENT DOCUMENTS

| | | | |
|---|---|---|---|
| 2,583,704 | 1/1952 | Nicholls et al. | 60/485 |
| 2,989,005 | 6/1961 | Gardineer | 92/58 |
| 3,044,412 | 7/1962 | Orshansky | 103/161 |
| 3,765,183 | 10/1973 | Baurle | 92/12.1 X |
| 4,581,895 | 9/1986 | Kress | 60/485 |
| 4,982,566 | 1/1991 | Von Kaler et al. | 92/58 X |
| 5,228,290 | 7/1993 | Speggiorin | 92/58 X |

FOREIGN PATENT DOCUMENTS

| | | |
|---|---|---|
| 0167043 | 1/1986 | European Pat. Off. . |
| 1285321 | 12/1968 | Germany . |
| 9208850 | 10/1992 | Germany . |
| 161192 | 2/1964 | U.S.S.R. ................... 92/58 |

Primary Examiner—Edward K. Look
Assistant Examiner—Hoang Nguyen
Attorney, Agent, or Firm—Ladas & Parry

[57] ABSTRACT

In a combination of two pressurized fluid motors fed in parallel by a common feed circuit, each of the pressurized fluid motors includes a casing and a cylinder block rotatable about an axis relative to a cam constrained to rotate with said casing and having a communication side perpendicular to the axis. An internal fluid distributor is constrained to rotate with the cam. It has a distribution side perpendicular to the axis and bears against the communication side. Distribution conduits open onto the distribution side and are formed in the internal fluid distributor of each motor. The casings of the two motors are constrained to rotate together.

21 Claims, 4 Drawing Sheets

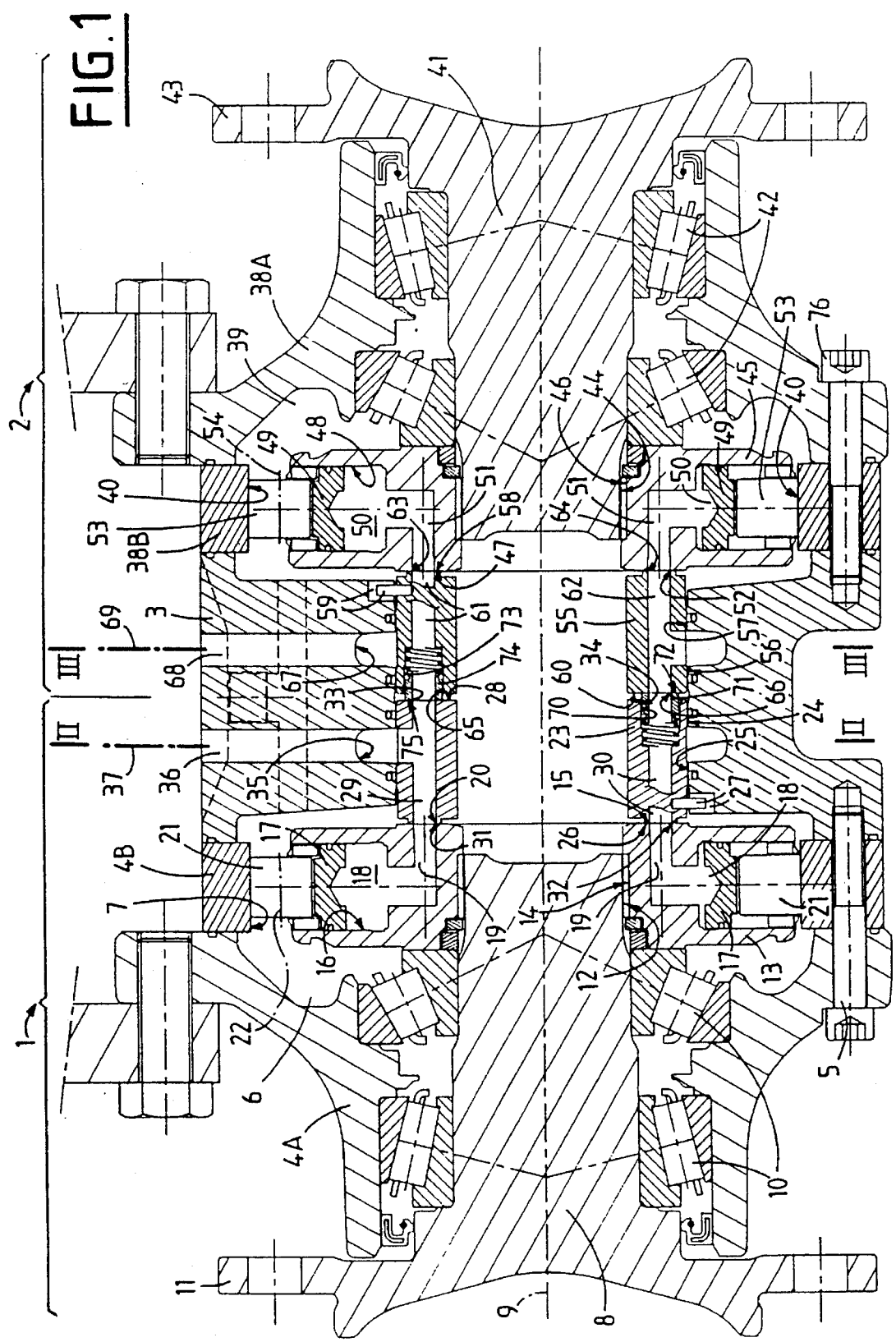

COMBINATION OF TWO PRESSURIZED FLUID MOTORS

FIELD OF THE INVENTION

Document FR-A-2-661 666 describes a forklift hydrostatic axle comprising a combination of a first pressurized fluid motor and a second pressurized fluid motor fed in parallel by a common pressurized fluid feed circuit including an external fluid feed conduit and an external fluid outlet conduit, each pressurized fluid motor including: a casing; a cylinder block rotatable about a rotation axis relative to a reaction member such as an undulating cam constrained to rotate with said casing and having a communication side perpendicular to the rotation axis; an internal fluid distributor constrained to rotate with said reaction member about said rotation axis and having a distribution side also perpendicular to the rotation axis and adapted to bear against said communication side of said pressurized fluid motor via an axial thrust device; and distribution conduits in the internal fluid distributor of each motor and opening onto said distribution side; the casings of the two motors being constrained to rotate together about said rotation axis.

OBJECTS AND SUMMARY OF THE INVENTION

This kind of combination of two hydrostatic motors provides satisfactory performance and mechanical strength but it has emerged that it can be significantly simplified in a way which reduces the length of the feed conduits of the two motors and therefore reduces their overall size and weight as well as reducing the number of component parts, in particular by making one part common to both motors.

Thus, in accordance with the invention the axial thrust devices of the internal fluid distributors of the two motors are constituted by a single axial thrust device disposed between said internal fluid distributors.

Although the invention stems from an improvement to the above prior art system and therefore proposes a new system of driving two receivers or two drive shafts by the two motors, the scope of the invention has subsequently widened, said two motors naturally being able to drive two separate receivers, but also, in other applications which also conform to the invention, to drive a single receiver to which both are coupled. In this latter category of variants of the invention the two motors can have a single shaft with which their respective cylinder blocks are both constrained to rotate.

The following advantageous features are preferably adopted:

each distribution conduit of the internal fluid distributor of the second motor communicates at all times with a distribution conduit of the internal fluid distributor of the first motor;

the internal fluid distributors have the same number of distribution conduits which communicate in pairs;

each internal fluid distributor has, axially opposite its distribution side, a thrust side perpendicular to said rotation axis, and in the thrust side of the internal fluid distributor of at least one motor some at least of its distribution conduits open at ends constituting housings to receive tubular connecting pegs each having a transverse side projecting relative to the housing of said connecting peg and communicating, firstly, with the distribution conduit of the internal distributor of a first motor, one end of which constitutes said housing for receiving the connecting peg, and, secondly, with a distribution conduit opening onto the thrust side of the internal fluid distributor of the second motor;

the internal fluid distributors of the two motors are identical;

the housings to receive the connecting pegs are formed in the internal fluid distributor of only one of the two motors;

the internal fluid distributor of each motor has an axial side having a plurality of staggered shoulders separated by axial cylindrical surfaces, said axial cylindrical surfaces of the internal fluid distributors of both motors being arranged in facing pairs with sealing means between them so that an axial balancing chamber for the internal fluid distributors of both motors is formed between the two internal fluid distributors and between two successive pairs of axial cylindrical surfaces, the set of said balancing chambers being part of said single axial thrust device;

part of the casing of the first motor and part of the casing of the second motor comprise a casing part common to the two motors and the internal fluid distributor of each motor is constrained to rotate with said casing part common to the two motors about the rotation axis;

the internal fluid distributors of the two motors are constrained to rotate with said casing part common to the two motors by means of at least one device with notches and an associated peg, the peg simultaneously constraining to rotate together said common casing part, the internal fluid distributor of the first motor and the internal fluid distributor of the second motor.

The main advantage of the invention resides in the novel compact size and lightness of the proposed combinations of two motors and in a correlative reduction in their unit cost, some components of the prior art combinations having been dispensed with.

BRIEF DESCRIPTION OF THE DRAWINGS

The invention will be better understood and secondary features of the invention and their advantages will emerge from the following description of embodiments of the invention given by way of example.

It is to be understood that the description and the drawings are given by way of non-limiting example only.

Figure 3:
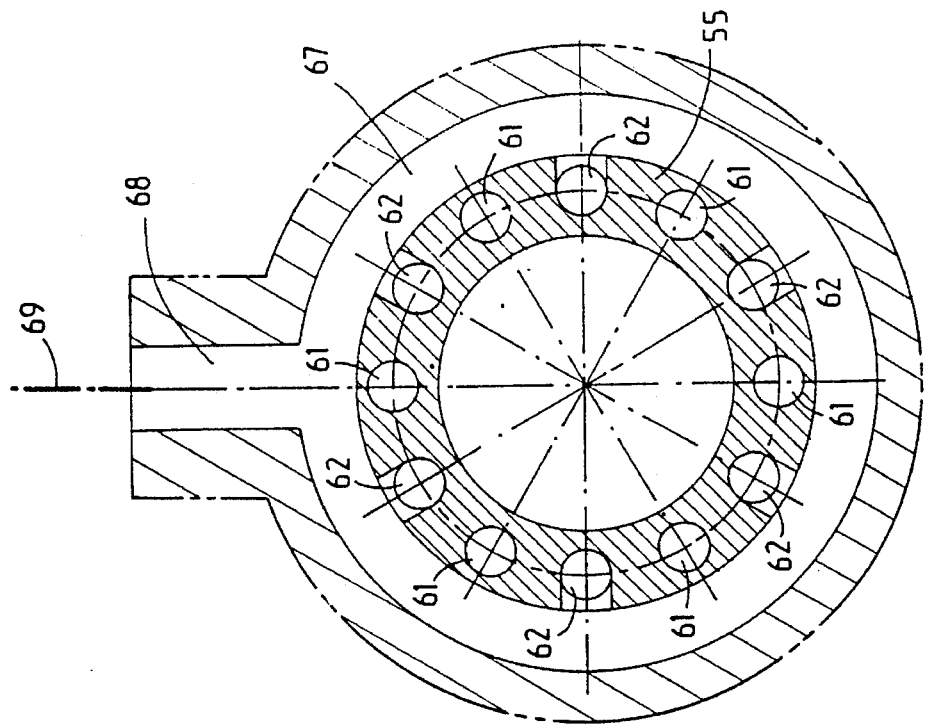
Figure 2:
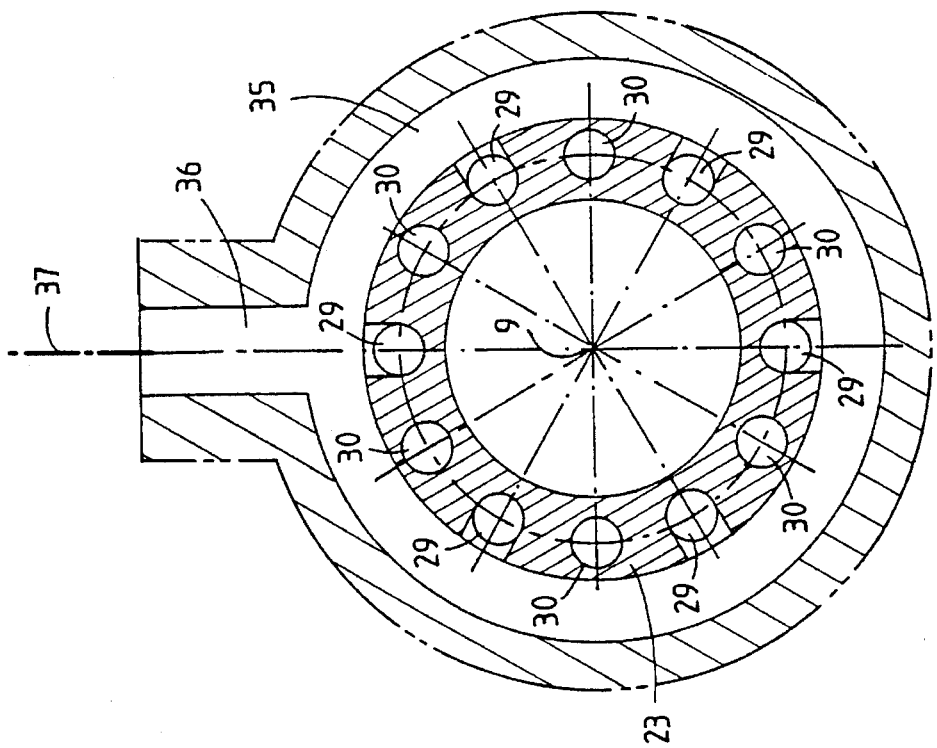
Figure 4:
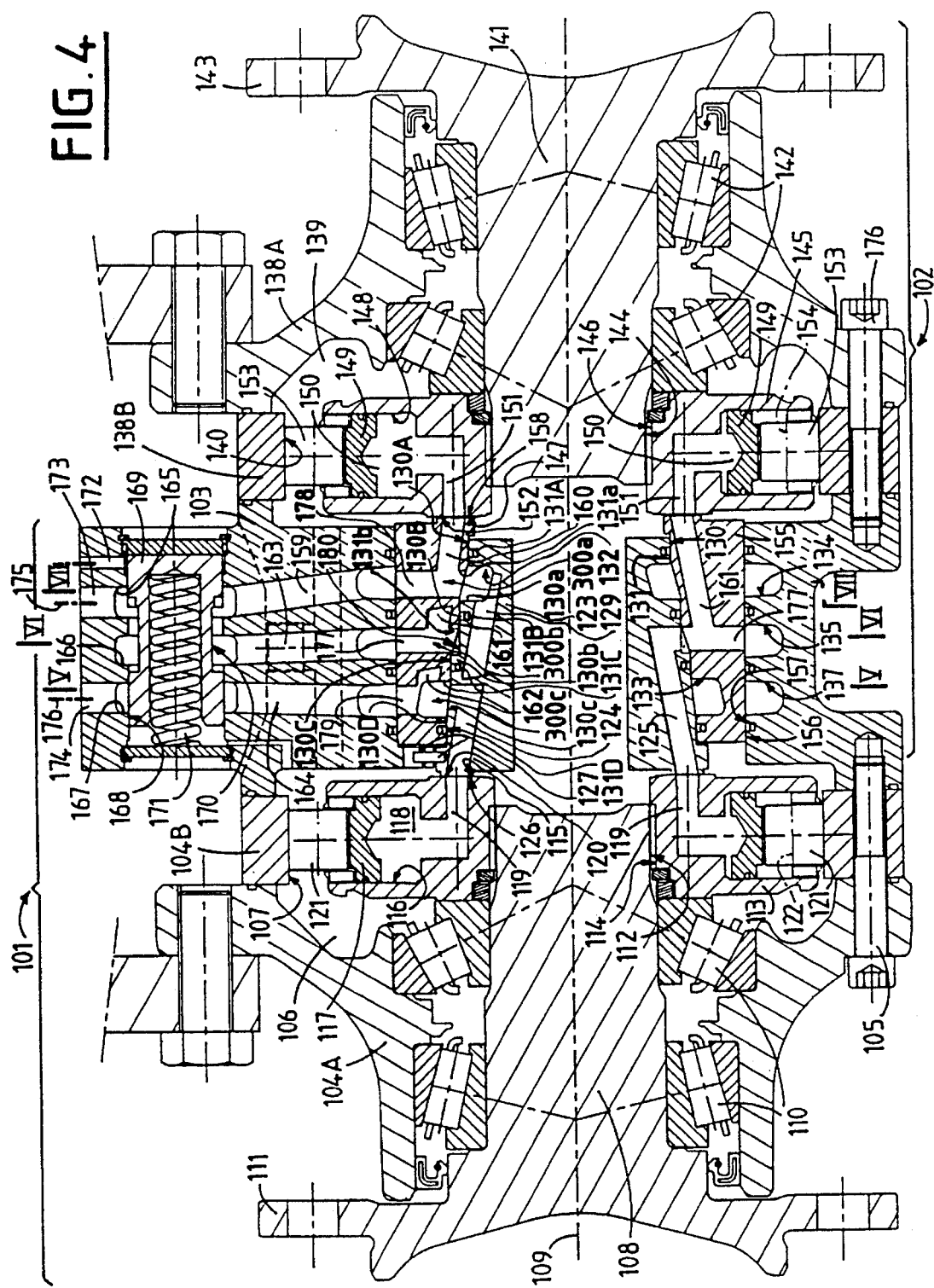
Figure 7:
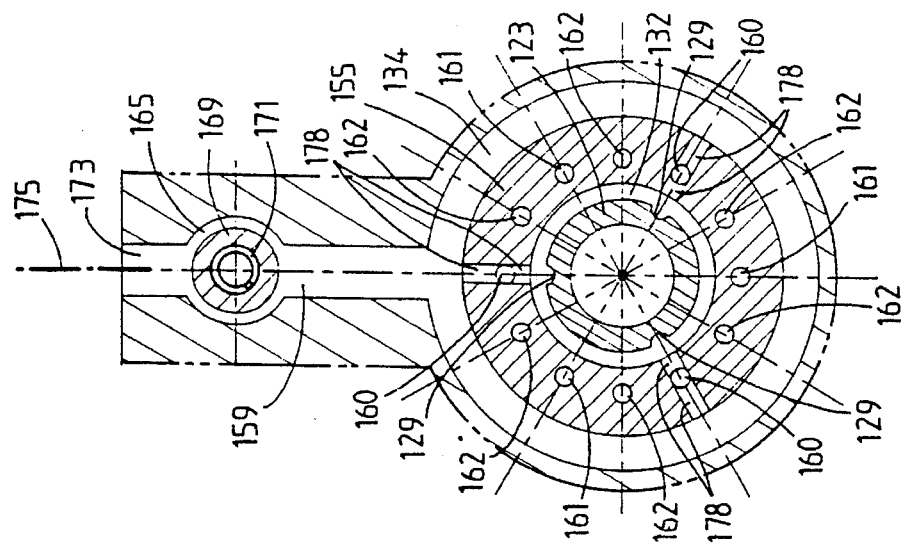
Figure 6:
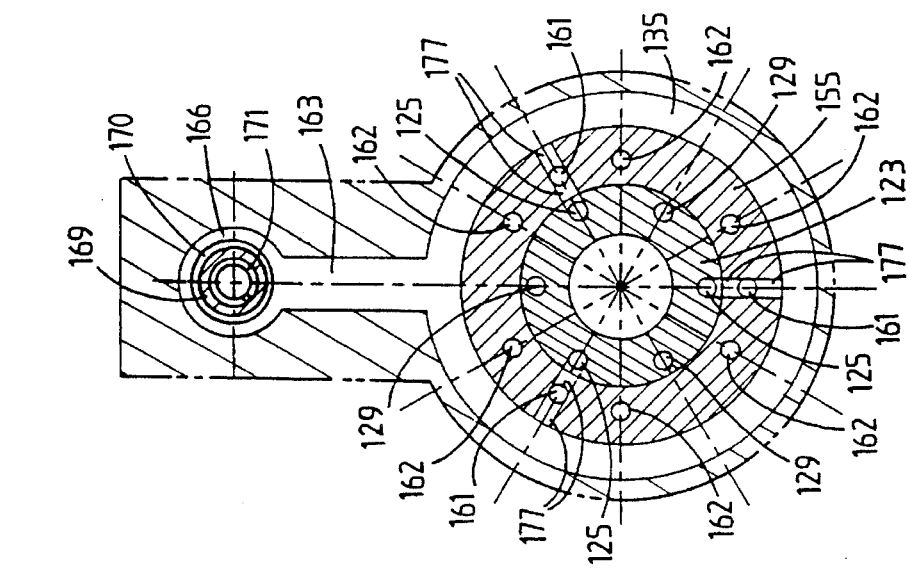
Figure 5:
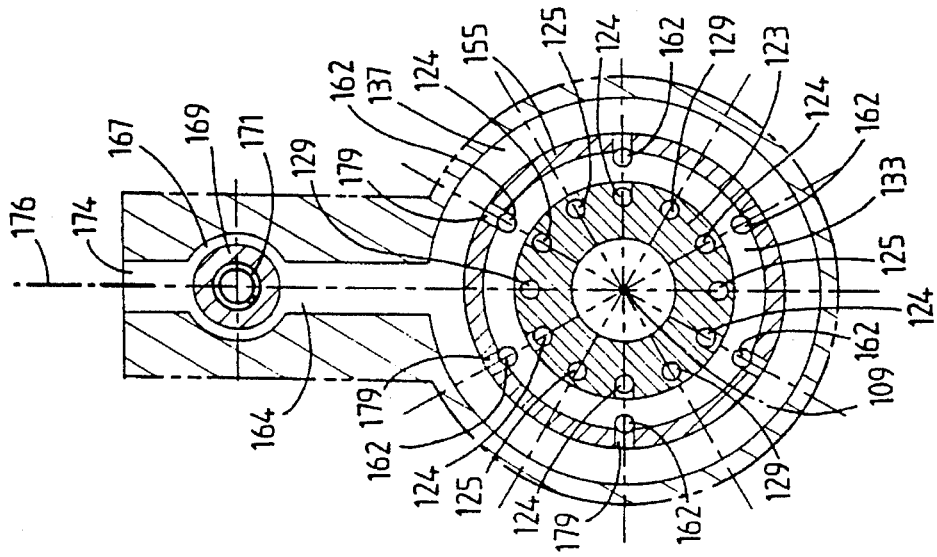

Reference will be made to the appended drawings, in which:

FIG. 1 is an axial section of a first embodiment of a combination in accordance with the invention;

FIGS. 2 and 3 are sections on the lines II—II and III—III, respectively, in FIG. 1;

FIG. 4 is an axial section of a second embodiment of a combination in accordance with the invention; and FIGS. 5, 6 and 7 are sections on the lines V—V, VI—VI and VII—VII, respectively, in FIG. 4.

MORE DETAILED DESCRIPTION

FIGS. 1 to 3 show a combination comprising two hydrostatic motors 1 and 2 having a common casing part 3.

The motor 1 comprises:

a casing in three parts 4A, 4B and 3 fastened together by screws 5 and delimiting a closed enclosure 6;

an undulating reaction cam 7 constituted by the internal periphery of casing part 4B;

a motor shaft 8 rotatable relative to the casing about a rotation axis 9 in roller bearings 10 and having a coupling flange 11 at its outside end and splines 12 at its inside end;

a cylinder block 13 with a central bore having splines 14 cooperating with the splines 12 on the shaft 8 to constrain the cylinder block 13 and the shaft 8 to rotate together about the rotation axis 9;

a plane communication side 15 perpendicular to the rotation axis 9 and which is part of the cylinder block 13;

equi-angularly spaced cylinders 16 formed in the cylinder block 13 and disposed radially relative to the axis 9;

pistons 17 sliding in the cylinders 16 and each delimiting inside a cylinder 16 a fluid working chamber 18 communicating with the communication side 15 via a cylinder conduit 19 which opens onto the latter via an orifice 20, the orifices 20 of the various cylinder conduits 19 being centered on a common circle concentric with the axis 9;

cylindrical rollers 21 with axes 22 parallel to the axis 9 rotating at the ends of the pistons 17 opposite the ends delimiting the chambers 18, one roller being mounted on each piston and being in rolling engagement with the cam 7;

an internal fluid distributor 23 having a cylindrical side 24 facing and in contact with a cylindrical side 25 of the common casing part 3 and a plane distribution side 26 perpendicular to the rotation axis 9 and bearing against the communication side 15;

a peg and notch device 27 constraining the internal fluid distributor 23 and the casing part 3 to rotate together about the axis 9;

a plane thrust side 28 of the internal fluid distributor 23 perpendicular to the rotation axis 9 and opposite the distribution side 26;

two groups of distribution conduits 29, 30 formed in the internal fluid distributor 23, in an alternating arrangement, which open via orifices 31, 32 centered on the same circle as the orifices 20 onto the distribution side 26 and via orifices 33, 34 onto the thrust side 28;

a groove 35 in casing part 3 with which communicate at all times, firstly, each distribution conduit 29 and, secondly, an internal conduit 36 formed in casing part 3 and connected to an external pressurized fluid feed conduit 37.

The motor 2 comprises:

a casing in three parts 38A, 38B and 3 fastened together by screws 76 and delimiting a closed enclosure 39;

an undulating reaction cam 40 constituted by the internal periphery of casing part 38B;

a motor shaft 41 rotatable relative to the casing about the rotation axis 9 in roller bearings 42 and having a coupling flange 43 at its outside end and splines 44 at its inside end;

a cylinder block 45 with a central bore having splines 46 cooperating with the splines 44 on the shaft 41 to constrain the cylinder block 45 and the shaft 41 to rotate together about the rotation axis 9;

a plane communication side 47 perpendicular to the rotation axis 9 and which is part of the cylinder block 45;

equi-angularly spaced cylinders 48 formed in the cylinder block 45 and disposed radially relative to the axis 9;

pistons 49 sliding in the cylinders 48 and each delimiting inside a cylinder 48 a fluid working chamber 50 communicating with the communication side 47 via a cylinder conduit 51 which opens onto the latter side via an orifice 52, the orifices 52 of the various cylinder conduits 51 being centered on a common circle concentric with the axis 9;

cylindrical rollers 53 with axes 54 parallel to the axis 9 rotating at the ends of the pistons 49 opposite the ends delimiting the chambers 50, one roller being mounted on each piston and being in rolling engagement with the cam 40;

an internal fluid distributor 55 having a cylindrical side 56 facing and in contact with a cylindrical side 57 of the common casing part 3 and a plane distribution side 58 perpendicular to the rotation axis 9 and bearing against the communication side 47;

a peg and notch device 59 constraining the internal fluid distributor 55 and the casing part 3 to rotate together about the rotation axis 9;

a plane thrust side 60 of the internal fluid distributor 55 perpendicular to the rotation axis 9 and opposite the distribution side 58;

two groups of distribution conduits 61, 62 formed in the internal fluid distributor 55, in an alternating arrangement, which open, firstly, via orifices 63, 64 centered on the same circle as the orifices 52 onto the distribution side 58 and, secondly, via orifices 65, 66 onto the thrust side 60;

a groove 67 in casing part 3 with which communicate at all times, firstly, each distribution conduit 62 and, secondly, an internal conduit 68 formed in casing part 3 and connected to an external unpressurized fluid outlet conduit 69. Naturally, the external conduits 37, 69 can, in the known way, have their functions interchanged and respectively contain the unpressurized outlet fluid and the pressurized feed fluid.

Note also that:

the cylindrical surfaces 25 and 57 formed in the common casing part 3 are, in the embodiment shown, aligned with each other, although this arrangement is not mandatory;

the ends of the distribution conduits 30 opening onto the thrust side 28 via the orifices 34 are shaped as housings 70 for axially hollowed out pegs 71;

each tubular peg 71 has a transverse side 72 projecting relative to its housing 70 and which bears against the thrust side 60 of the internal fluid distributor 55;

likewise, the ends of the distribution conduits 61 which open onto the thrust side 60 via the orifices 65 are shaped as housings 73 for axially hollowed out pegs 74;

each tubular peg 74 has a transverse side 75 projecting relative to its housing 73 and which bears against the thrust side 28 of the internal fluid distributor 23;

the two internal fluid distributors 23 and 55, constrained to rotate with the common casing part 3 about the rotation axis 9 by the devices 27 and 59, have a relative angular offset providing communication between the tubular pegs 71, 74 and the facing distribution conduits 62, 29, respectively.

Likewise the tubular pegs 71 establish communication between the distribution conduits 30 and 62 and the tubular pegs 74 establish communication between the distribution conduits 29 and 61.

In the embodiment described the internal fluid distributors 23 and 55 are identical, which reduces the cost of manufacture. Also, as the housings 70 and 73 are at the ends of non-consecutive distribution conduits, it is possible to use large diameter pegs, which is sometimes required to achieve satisfactory balancing of the internal fluid distributors. What is essential is of course the communication between the distribution conduits of the two internal fluid distributors; to this end, in another embodiment of the invention all the tubular pegs are received in housings formed in a single one of the two internal fluid distributors 23, 55 and bear against the thrust side of the other internal fluid distributor, so that the housings for said tubular pegs can be machined in only one of the two internal fluid distributors.

The combination of two motors shown in FIGS. 1 to 3 is a combination of low-speed hydrostatic motors each having a single cylinder capacity.

The combination of two motors shown in FIGS. 4 to 7 is also a combination of two low-speed hydrostatic motors 101, 102 but is different in that, firstly, the conformation of the internal fluid distributors is different, their axial faces having a plurality of staggered shoulders and, secondly, each motor has two different cylinder capacities and is provided with a cylinder capacity selector device.

The motor 101 comprises:

a casing in three parts 104A, 104B and 103 fastened together by screws 105 and delimiting a closed enclosure 106;

an undulating reaction cam 107 constituted by the internal periphery of casing part 104B;

a motor shaft 108 rotatable relative to the casing about a rotation axis 109 in roller bearings 110 and having a coupling flange 111 at its outside end and splines 112 at its inside end;

a cylinder block 113 with a central bore having splines 114 cooperating with the splines 112 on the shaft 108 to constrain the cylinder block 113 and the shaft 108 to rotate together about the rotation axis 109;

a plane communication side 115 perpendicular to the rotation axis 109 and which is part of the cylinder block 113;

equi-angularly spaced cylinders 116 formed in the cylinder block 113 and disposed radially relative to the axis 109;

pistons 117 sliding in the cylinders 116 and each delimiting inside a cylinder 116 a fluid working chamber 118 communicating with the communication side 115 via a cylinder conduit 119 which opens onto the latter side via an orifice 120, the orifices 120 of the various cylinder conduits 119 being centered on a common circle concentric with the axis 109;

cylindrical rollers 121 with axes 122 parallel to the axis 109 rotating at the ends of the pistons 117 opposite the ends delimiting the chambers 118, one roller being mounted on each piston and being in rolling engagement with the cam 107;

an internal fluid distributor 123 having a plane distribution side 126 perpendicular to the rotation axis 109 and bearing against the communication side 115;

a peg and notch device 127 constraining the internal fluid distributor 123 and the casing part 103 to rotate together about the rotation axis 109;

three groups of distribution conduits 124, 125, 129 formed in the internal fluid distributor 123 which open via orifices centered on the same circle as the orifices 120 of the cylinder conduits 119 onto the distribution side 126.

The motor 102 comprises:

a casing in three parts 138A, 138B and 103 fastened together by screws 176 and delimiting a closed enclosure 139;

an undulating reaction cam 140 constituted by the internal periphery of casing part 138B;

a motor shaft 141 rotatable relative to the casing about the rotation axis 109 in roller bearings 142 and having a coupling flange 143 at its outside end and splines 144 at its inside end;

a cylinder block 145 with a central bore having splines 146 cooperating with the splines 144 on the shaft 141 to constrain the cylinder block 145 and the shaft 141 to rotate together about the rotation axis 109;

a plane communication side 147 perpendicular to the rotation axis 109 and which is part of the cylinder block 145;

equi-angularly spaced cylinders 148 formed in the cylinder block 145 and disposed radially relative to the axis 109;

pistons 149 sliding in the cylinders 148 and each delimiting inside a cylinder 148 a fluid working chamber 150 communicating with the communication side 147 via a cylinder conduit 151 which opens onto the latter side via an orifice 152, the orifices 152 of the various cylinder conduits 151 being centered on a common circle concentric with the axis 109;

cylindrical rollers 153 with axes 154 parallel to the axis 109 rotating at the ends of the pistons 149 opposite the ends delimiting the chambers 150, one roller being mounted on each piston and being in rolling engagement with the cam 140;

an internal fluid distributor 155 having a cylindrical side 156 facing and in contact with a cylindrical side 157 of the common casing part 103 and a plane distribution side 158 perpendicular to the rotation axis 109 and bearing against the communication side 147;

the peg and notch device 127 constraining the internal fluid distributor 155 and the casing part 103 to rotate together about the rotation axis 109, the peg of the device 127 also constraining the two internal fluid distributors 123 and 155 to rotate with the common casing part 103;

three groups of distribution conduits 160, 161, 162 formed in the internal fluid distributor 155 and which open via orifices centered on the same circle as the orifices 152 of the cylinder conduits 151 onto the distribution side 158.

The internal fluid distributor 123 also has a staggered axial side 130 of complementary shape to an axial side 131 of the internal fluid distributor 155. The axial side 130 has a plurality of staggered shoulders 130a, 130b, 130c separated by axial cylindrical surfaces 130A, 130B, 130C and 130D. The axial side 131 has a plurality of staggered shoulders 131a, 131b, 131c separated by axial cylindrical surfaces 131A, 131B, 131C and 131D. The axial cylindrical faces 130A, 131A; 130B, 131B; 130C, 131C; 130D, 131D respectively face each other, so that axial balancing chambers 300a, 300b and 300c are respectively formed. Three grooves 132, 133, 180 are formed in the internal fluid distributors 123, 155 and open onto their respective axial sides 130, 131. Three other grooves 134, 135, 137 formed in casing part 103 open onto its cylindrical axial side 157 and are connected by three conduits 159, 163, 164 formed in casing part 103 to three respective grooves 165, 166, 167 opening into a cylindrical bore 168 in casing part 103. A slide valve 169 slides in the bore 168 and has a groove 170 to establish communication between either grooves 165 and 166 or grooves 166 and 167. The effect of a spring 171 between the slide valve 169 and casing part 103 in the former case predominates over the effect of an unpressurized fluid in a control conduit 172 and in the latter case is neutralized by the effect of the pressure of a pressurized control fluid in the control conduit 172. Conduits 173, 174 in casing part 103 connect the grooves 165, 167 to external pressurized fluid feed and unpressurized fluid outlet conduits 175, 176, respectively.

Note also the communication between:

conduits 124 and groove 133;

conduits 125 and groove 180 and, via conduits 177 in the internal fluid distributor 155, groove 135;

conduits 129 and groove 132;

conduits 160 and groove 132 and, via conduits 178 in the internal fluid distributor 155, groove 134;

conduits 161 and conduits 177;

conduits 162 and groove 133 and, via conduits 179 in the internal fluid distributor 155, groove 137.

The distribution conduits 124, 125, 129 alternate, opening onto the distribution side 126 in the following order: conduit 124, conduit 125, conduit 124, conduit 129, and so on.

The distribution conduits 160, 161, 162 likewise open alternately onto the distribution side 158 in the following order: conduit 160, conduit 162, conduit 161, conduit 162, and so on.

The combination shown in FIGS. 1 to 3 operates as follows: the pressurized fluid discharged by a main pump in the conduit 37 is conveyed to the groove 35 and thence, firstly, into the distribution conduits 29 to feed the successive chambers 18 of the motor 1 and, secondly, into the distribution conduits 61 to feed the successive chambers 50 of the motor 2. The fluid can then escape from the chambers 18 and 50 via the distribution conduits 30 and 62, the groove 67 and the conduits 68 and 69.

The pressures of the fluids in the conduits 29 and 61 and in the conduits 30 and 62 tend to separate the thrust sides 28 and 60 and so to push the distribution side 26 of the internal fluid distributor 23 onto the communication side 15 of the cylinder block 13 and the distribution side 58 of the internal fluid distributor 55 onto the communication side 47 of the cylinder block 45; this occurs without the intervention of any component other than the tubular pegs 71 and 74 and in particular with no back closing off the casing between the two internal fluid distributors 23 and 55.

The combination shown in FIGS. 4 to 7 operates in a similar way except for the cylinder capacity selection aspect, which is known in itself and does not need to be described again here.

With reference to the generation of the forces which press the distribution side 126 of the internal fluid distributor 123 onto the communication side 115 of the cylinder block 113 and the distribution side 158 of the internal fluid distributor 155 onto the communication side 147 of the cylinder block 145, note that the respective pressures of the fluids in the distribution conduits 124, 125, 129 and 160, 161, 162 tend to push apart the internal fluid distributors in the required axial direction regardless of the value of these pressures.

Manufacture of combinations in accordance with the invention is facilitated and the combinations are more compact in size, lighter in weight and lower in cost than prior art combinations because of the unique nature of the conduits 37, 36 and 69, 68 in the FIGS. 1 to 3 embodiment and the conduits 176, 174, 164 and 175, 173, 159 in the FIGS. 4 to 7 embodiment, the absence of any back of the casing between the internal fluid distributors 23 and 55 or 123 and 155 and the existence of the common casing part 3 or 103.

The unique nature of the peg of the device 127 constraining the internal fluid distributors 123 and 155 and casing part 103 to rotate together also makes the device 127 compact in size, light in weight and low in cost.

The invention applies to combinations of two motors each having a single cylinder capacity and fed via tubular pegs 71, 74 as in the combination of FIGS. 1 to 3 and to combinations of two motors fed via tubular pegs and each having two cylinder capacities since, regardless of the cylinder capacity in use, the pressure of the fluids in the mutually facing distribution conduits of the two internal fluid distributors, tends to press the distribution side of each internal fluid distributor against the facing communication side.

The invention likewise applies to combinations of two motors each having more than one cylinder capacity and fed via internal fluid distributors with staggered axial sides 130, 131 like the motors 101 and 102 of the combination of FIGS. 4 to 7 and to combinations of two motors fed via internal fluid distributors with staggered axial sides but each having only one cylinder capacity. The forces pushing the distribution sides of their internal fluid distributors against the communication sides of the cylinder blocks of the motors exist and operate whether the motors have one or more than one cylinder capacity.

If the motors have more than one cylinder capacity the motor cylinder capacity selector device can include, in the known manner, a slide valve like the slide valve 169 of the embodiment of FIGS. 4 to 7, which is parallel to the axis 109 but offset therefrom or a slide valve concentric with the axis 109, located centrally in the combination of two motors, or even a plurality of slide valves. The choice of motor cylinder capacity selector device does not impact on the operation of the invention, which resides in the generation of a mutually repulsive force between the two internal fluid distributors, pressing their distribution sides 126 and 158, in the FIG. 4 embodiment, against the communication sides of the respective cylinder blocks.

Finally, note that the two motors of a combination in accordance with the invention are not necessarily identical. It is entirely feasible for one of the motors to have a greater number of cam undulations than the other and consequently a greater number of pairs of distribution conduits than the other motor. All that is required is for some of the distribution conduits of the two motors to be connectable to a pressurized fluid feed (conduit 37 in FIGS. 1 and 2, conduit 175 in FIGS. 4 and 7) end others to an unpressurized fluid outlet (conduit 69 in FIGS. 1 and 3, conduit 176 in FIGS. 4 and 5). It is even possible for one motor to have only one cylinder capacity and for the other motor to have a plurality of cylinder capacities. In all the cases considered here, a mutually repulsive force generated by the pressures of the fluids in the distribution conduits of the internal fluid distributors pushes each internal fluid distributor towards the communication side of the motor of which it is part.

Other embodiments also conform to the invention.

For example:

the distribution conduits of the two motors can have different diameters, if motors with more than one cylinder capacity are chosen, their distribution arrangements can be asymmetric, as in FIGS. 4 to 7, or symmetrical.

The invention is not limited to the embodiments described but to the contrary encompasses all variants that can be made thereto without departing from the ambit or the spirit of the invention.

We claim:

1. A combination of a first pressurized fluid motor and a second pressurized fluid motor fed in parallel by a common pressurized fluid feed circuit including an external fluid feed conduit and an external fluid outlet conduit, each of said pressurized fluid motors including:

a casing;

a cylinder block rotatable about a rotation axis relative to a reaction member constrained to rotate with said casing and having a communication side perpendicular to said rotation axis;

an internal fluid distributor constrained to rotate with said reaction member about said rotation axis and having a distribution side also perpendicular to said rotation axis and adapted to bear against said communication side of said pressurized fluid motor; and distribution conduits in said internal fluid distributor opening onto said distribution side;

the casings of said two motors being constrained to rotate together about said rotation axis;

wherein said internal fluid distributor of said first pressurized fluid motor presents a first connecting face and said internal fluid distributor of said second pressurized fluid motor presents a second connecting face, said first and second connecting faces facing each other and hydraulically connecting said internal fluid distributors to one another, said internal fluid distributors being axially slightly movable with respect to one another and the pressures of fluids in said distribution conduits tending to separate said first and second connecting faces, so that said distribution sides of said internal fluid distributors of said first and second pressurized fluid motors respectively thrust against said communication sides of said cylinder blocks of said first and second pressurized fluid motors.

2. A combination of a first pressurized fluid motor and a second pressurized fluid motor fed in parallel by a common pressurized fluid feed circuit including an external fluid feed conduit and an external fluid outlet conduit, each of said pressurized fluid motors including:

a casing;

a cylinder block rotatable about a rotation axis relative to a reaction member constrained to rotate with said casing and having a communication side perpendicular to said rotation axis;

an internal fluid distributor constrained to rotate with said reaction member about said rotation axis and having a distribution side also perpendicular to said rotation axis and adapted to bear against said communication side of said pressurized fluid motor, said internal fluid distributor having, axially opposite the distribution side thereof, a thrust side perpendicular to said rotation axis;

distribution conduits in said internal fluid distributor opening onto said distribution side;

the casings of said firs and second pressurized fluid motors being constrained to rotate together about said rotation axis;

at least some of the distribution conduits of the internal distributor of at least one of said first and second pressurized fluid motors opening in the thrust side of said internal distributor at ends constituting housings to receive tubular connecting pegs, each of said connecting pegs having a transverse side projecting relative to the housing to receive said connecting peg and communicating, firstly, with the distribution conduit of the internal distributor of one of said first and second pressurized fluid motors, one end of said distribution conduit constituting said housing for receiving said connecting peg and, secondly, with a distribution conduit opening onto the thrust side of the internal fluid distributor of another of said first and second pressurized fluid motors; and said internal fluid distributors being axially slightly movable with respect to one another and the pressures of fluids in said distribution conduits tending to separate said first and second thrust sides, so that said distribution sides of said internal fluid distributors of said first and second pressurized fluid motors respectively thrust against said communication sides of said cylinder blocks of said first and second pressurized fluid motors.

3. The combination according to claim 2, wherein the internal fluid distributors of the tow motors are identical.

4. The combination according to claim 2, wherein said housings to receive the connecting pegs are formed in the internal fluid distributor of only one of the two motors.

5. A combination of a first pressurized fluid motor and a second pressurized fluid motor fed in parallel by a common pressurized fluid feed circuit including an external fluid feed conduit and an external fluid outlet conduit, each of said pressurized fluid motors including:

a casing;

a cylinder block rotatable about a rotation axis relative to a reaction member constrained to rotate with said casing and having a communication side perpendicular to said rotation axis;

an internal fluid distributor constrained to rotate with said reaction member about said rotation axis and having a distribution side also perpendicular to said rotation axis and adapted to bear against said communication side of said pressurized fluid motor, said internal fluid distributor having an axial side having a plurality of staggered shoulders and a plurality of axial cylindrical surfaces separating said staggered shoulders;

distribution conduits in said internal fluid distributor opening onto said distribution side;

the casings of said first and second pressurized fluid motors being constrained to rotate together about said rotation axis;

said axial cylindrical surfaces of said internal fluid distributors of both of said pressurized fluid motors being arranged in pairs in facing relationship and sealing means being provided between the two axial cylindrical surfaces of each one of said pairs, so that axial balancing chambers for the internal fluid distributors of both of said pressurized fluid motors are formed, each of said axial balancing chambers being formed between said two internal fluid distributors and between two successive pairs of axial cylindrical surfaces, at least some of said distribution conduits opening into said axial balancing chambers, and said internal fluid distributors being axially slightly movable with respect to one another and the pressures of fluids in said distribution conduits and in said balancing chambers tending to separate said first and second axial sides, so that said distribution sides of said internal fluid distributors of said first and second pressurized fluid motors respectively thrust against said communication sides of said cylinder blocks of said first and second pressurized fluid motors.

6. The combination according to claim 1 wherein part of the casing of the first motor and part of the casing of the second motor comprise a casing part common to the two motors and the internal fluid distributor of each motor is constrained by means to rotate with said casing part common to the two motors about the rotation axis.

7. The combination according to claim 2, wherein part of the casing of the first motor and part of the casing of the second motor comprise a casing part common to the two motors and the internal fluid distributor of each motor is constrained by means to rotate with said casing part common to the two motors about the rotation axis.

8. The combination according to claim 5, wherein part of the casing of the first motor and part of the casing of the second motor comprise a casing part common to the two motors and the internal fluid distributor of each motor is constrained by means to rotate with said casing part common to the two motors about the rotation axis.

9. The combination according to claim 8 wherein the internal fluid distributors of the two motors are constrained to rotate with said casing part common to the two motors by means of at least one device with notches and an associated peg, the peg simultaneously constraining to rotate together said common member, the internal fluid distributor of the first motor and the internal fluid distributor of the second motor.

10. The combination according to claim 1 wherein each distribution conduit of the internal fluid distributor of the second motor communicates at all times with a distribution conduit of the internal fluid distributor of the first motor.

11. The combination according to claim 10 wherein each internal fluid distributor has, axially opposite the distribution side thereof, a thrust side perpendicular to said rotation axis, and wherein in the thrust side of the internal fluid distributor of at least one of said first and second motor, at least some of the distribution conduits thereof open at ends constituting housings to receive tubular connecting pegs, each having a transverse side projecting relative to the housing of said connecting peg and communicating, firstly, with the distribution conduit of the internal distributor of one of the first and second motors, one end of said distribution conduit constituting said housing for receiving the connecting peg and, secondly, with a distribution conduit opening onto the thrust side of the internal fluid distributor of the other of the first and second motors, said thrust sides of said internal fluid distributors of said first and second motors respectively constituting said first and second connecting faces.

12. The combination according to claim 11 wherein the internal fluid distributors of the two motors are identical.

13. The combination according to claim 11 wherein the housings to receive the connecting pegs are formed in the internal fluid distributor of only one of the two motors.

14. The combination according to claim 10 wherein the internal fluid distributor of each motor has an axial side having a plurality of staggered shoulders and a plurality of axial cylindrical surfaces separating said staggered shoulders, said axial cylindrical surfaces of the internal fluid distributors of both of said motors being arranged in pairs in facing relationship, and sealing means being provided between two axial cylindrical surfaces of each of said pairs, so that an axial balancing chamber for the internal fluid distributors of both said motors is formed between the two internal fluid distributors and between two successive pairs of said axial cylindrical surfaces, said axial sides of said internal fluid distributors of said first and second motors respectively constituting said first and second connecting faces.

15. The combination according to claim 10 wherein part of the casing of the first motor and part of the casing of the second motor comprise a casing part common to the two motors and the internal fluid distributor of each motor is constrained by means to rotate with said casing part common to the two motors about the rotation axis.

16. The combination according to claim 10 wherein the internal fluid distributors have the same number of distribution conduits which communicate in pairs.

17. The combination according to claim 16 wherein each internal fluid distributor has, axially opposite the distribution side thereof, a thrust side perpendicular to said rotation axis, and wherein in the thrust side of the internal fluid distributor of at least one of said first and second motors at least some of the distribution conduits thereof open at ends constituting housings to receive tubular connecting pegs, each having a transverse side projecting relative to the housing of said connecting peg and communicating, firstly, with the distribution conduit of the internal distributor of one of said first and second motors, one end of said distribution conduit constituting said housing for receiving the connecting peg and, secondly, with a distribution conduit opening onto the thrust side of the internal fluid distributor of another of the first and second motors, said thrust sides of said internal fluid distributors of said first and second motors respectively constituting said first and second connecting faces.

18. The combination according to claim 17 wherein the internal fluid distributors of the two motors are identical.

19. The combination according to claim 17 wherein the housings to receive the connecting pegs are formed in the internal fluid distributor of only one of the two motors.

20. The combination according to claim 16 wherein the internal fluid distributor of each motor has an axial side having a plurality of staggered shoulders and a plurality of axial cylindrical surfaces separating said staggered shoulders, said axial cylindrical surfaces of the internal fluid distributors of both of said motors being arranged in pairs in facing relationship, and sealing means being provided between two axial cylindrical surfaces of each of said pairs, so that an axial balancing chamber for the internal fluid distributors of both of said motors is formed between the two internal fluid distributors and between two successive pairs of said axial cylindrical surfaces, said axial sides of said internal fluid distributors of said first and second motors respectively constituting said first and second connecting faces.

21. The combination according to claim 16 wherein part of the casing of the first motor and part of the casing of the second motor comprise a casing part common to the two motors and the internal fluid distributor of each motor is constrained by means to rotate with said casing part common to the two motors about the rotation axis.

* * * * *